US012370711B2

(12) United States Patent
Rolling

(10) Patent No.: US 12,370,711 B2
(45) Date of Patent: Jul. 29, 2025

(54) SYSTEMS AND METHODS FOR TRIMMING DREADLOCKS

(71) Applicant: Corey Rolling, Chicago, IL (US)

(72) Inventor: Corey Rolling, Chicago, IL (US)

( * ) Notice: Subject to any disclaimer, the term of this patent is extended or adjusted under 35 U.S.C. 154(b) by 355 days.

(21) Appl. No.: 17/517,376

(22) Filed: Nov. 2, 2021

(65) Prior Publication Data

US 2022/0126471 A1 Apr. 28, 2022

Related U.S. Application Data

(60) Continuation of application No. 17/027,394, filed on Sep. 21, 2020, now Pat. No. 11,161,264, which is a division of application No. 16/016,017, filed on Jun. 22, 2018, now Pat. No. 10,875,200.

(51) Int. Cl.

| | |
|---|---|
| ***B26B 21/56*** | (2006.01) |
| ***B26B 21/22*** | (2006.01) |
| ***B26B 21/38*** | (2006.01) |
| ***B26B 21/40*** | (2006.01) |
| ***B26B 21/52*** | (2006.01) |

(52) U.S. Cl.

CPC ........ *B26B 21/565* (2013.01); *B26B 21/4031* (2013.01); *B26B 21/4081* (2013.01); *B26B 21/522* (2013.01); *B26B 21/227* (2013.01); *B26B 21/38* (2013.01); *B26B 21/405* (2013.01); *B26B 21/526* (2013.01)

(58) Field of Classification Search

CPC . B26B 21/565; B26B 21/4081; B26B 21/522; B26B 21/227; B26B 21/38; B26B 21/405; B26B 21/526; B26B 21/4031; A01G 3/02; A01G 2005/005; A01G 2003/005; A45D 27/00; A01F 11/06

USPC .. 30/121, 90.1–91.2, 352, 29.5, 29.6, 121.5; 83/13

See application file for complete search history.

(56) References Cited

U.S. PATENT DOCUMENTS

| | | | | |
|---|---|---|---|---|
| 1,792,415 A | | 2/1931 | Dean | |
| 2,089,486 A | * | 8/1937 | Kuhn | B26B 21/30 30/29.5 |
| 2,412,149 A | | 12/1946 | Higgins | |
| 3,735,487 A | | 5/1973 | Wojcik | |
| 5,864,953 A | | 2/1999 | Blake | |
| 5,979,056 A | * | 11/1999 | Andrews | B26B 21/22 30/356 |
| 6,438,848 B1 | * | 8/2002 | McHenry | B26B 1/048 30/160 |
| 8,959,775 B2 | | 2/2015 | Yabuuchi et al. | |
| 9,198,493 B2 | | 12/2015 | Hall | |

(Continued)

*Primary Examiner* — Adam J Eiseman
*Assistant Examiner* — Robert D Cornett
(74) *Attorney, Agent, or Firm* — Foley & Lardner LLP

(57) ABSTRACT

A trimming assembly for dreadlocks comprises a handle. A cutting head is operatively connected to the handle. The cutting head comprises a cutting head body defining a receptacle at a radial end thereof. The receptacle is structured to receive a dreadlock. A blade protector is positioned axially within the receptacle. A curvature of the blade protector corresponds to a curvature of an inner wall of the receptacle. A blade is interposed between the blade protector and the inner wall. The blade defines a cutting edge at an axial end thereof proximate to the handle. The cutting edge is structured to cut loose hair protruding outwards from the dreadlock as the cutting head is moved along the dreadlock.

20 Claims, 7 Drawing Sheets

(56) References Cited

U.S. PATENT DOCUMENTS

| | | | | |
|---|---|---|---|---|
| 2003/0106220 | A1* | 6/2003 | Caldwell | B26B 21/4081 30/49 |
| 2014/0230838 | A1 | 8/2014 | Reed | |
| 2014/0283390 | A1* | 9/2014 | Hall | B26B 19/00 132/226 |

* cited by examiner

SYSTEMS AND METHODS FOR TRIMMING DREADLOCKS

CROSS-REFERENCE TO RELATED APPLICATIONS

This application is a continuation of U.S. patent application Ser. No. 17/027,394, filed Sep. 21, 2020, now U.S. Pat. No. 11,161,264, which is a divisional of U.S. patent application Ser. No. 16/016,017, filed Jun. 22, 2018, now U.S. Pat. No. 10,875,200, the contents of which are incorporated herein by reference.

TECHNICAL FIELD

The present disclosure relates generally to systems and methods for trimming dreadlocks.

BACKGROUND

The term "dreadlocks" or "locs" refers to a group of hairs extending from a small area of the scalp that are entangled or matted together. The term "dreadlocks" refers to a hair style that comprises at least one dreadlock and usually more than one. The size of the dreadlocks depends on the number of hairs entangled and/or matted amongst one another. The density of the dreadlocks depends on how tightly the individual hair shafts are packed. The term "braid" and braiding refers to a distinct hair style and process in which typically three bundles of hair extending substantially one common part of the scalp are crossed over each other to form the braid. A braid or braided hair style typically utilizes a plurality of such braids. A common issue with dreadlocks and braids is loose and loose hair which gives a unkempt look to the style.

SUMMARY

Embodiments described herein relate generally to systems and methods for trimming loose hair from dreadlocks, and in particular, to a trimming assembly that includes a cutting head having a receptacle for receiving a single dreadlock and has blades for trimming loose hair from the dreadlock as the cutting head is moved along the dreadlock.

In some embodiments, a trimming assembly for dreadlocks comprises a handle. A cutting head is operatively connected to the handle. The cutting head comprises a cutting head body defining a receptacle at a radial end thereof. The receptacle is structured to receive a dreadlock. A blade protector is positioned axially within the receptacle. A curvature of the blade protector corresponds to a curvature of an inner wall of the receptacle. A blade is interposed between the blade protector and the inner wall. The blade defines a cutting edge at an axial end thereof proximate to the handle. The cutting edge is structured to cut loose hair protruding outwards from the dreadlock as the cutting head is moved along the dreadlock.

In some embodiments, a cutting head for a trimming assembly comprises a cutting head body defining a receptacle at a radial end thereof. The receptacle is structured to receive a dreadlock. A blade protector is positioned axially within the receptacle. A curvature of the blade protector corresponds to a curvature of an inner wall of the receptacle. A blade is interposed between the blade protector and the inner wall. The blade defines a cutting edge at an axial end thereof and is configured to cut loose hair protruding outwards from the dreadlock as the cutting head is moved along the dreadlock.

In some embodiments, a method for trimming loose hair from a dreadlock comprises providing a trimming assembly comprising a handle and a cutting head. The cutting head comprises a cutting head body defining a receptacle a radial end thereof. A blade protector is positioned axially within the receptacle. A curvature of the blade protector corresponds to a curvature of an inner wall of the receptacle. A blade is interposed between the blade protector and the inner wall. The blade defines a cutting edge at an axial end thereof proximate to the handle. A dreadlock is positioned in the receptacle. The trim assembly is moved from a first end towards a second end of the deadlock. The movement causes the cutting edge of the blade to cut loose hair protruding outwards from the dreadlock.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
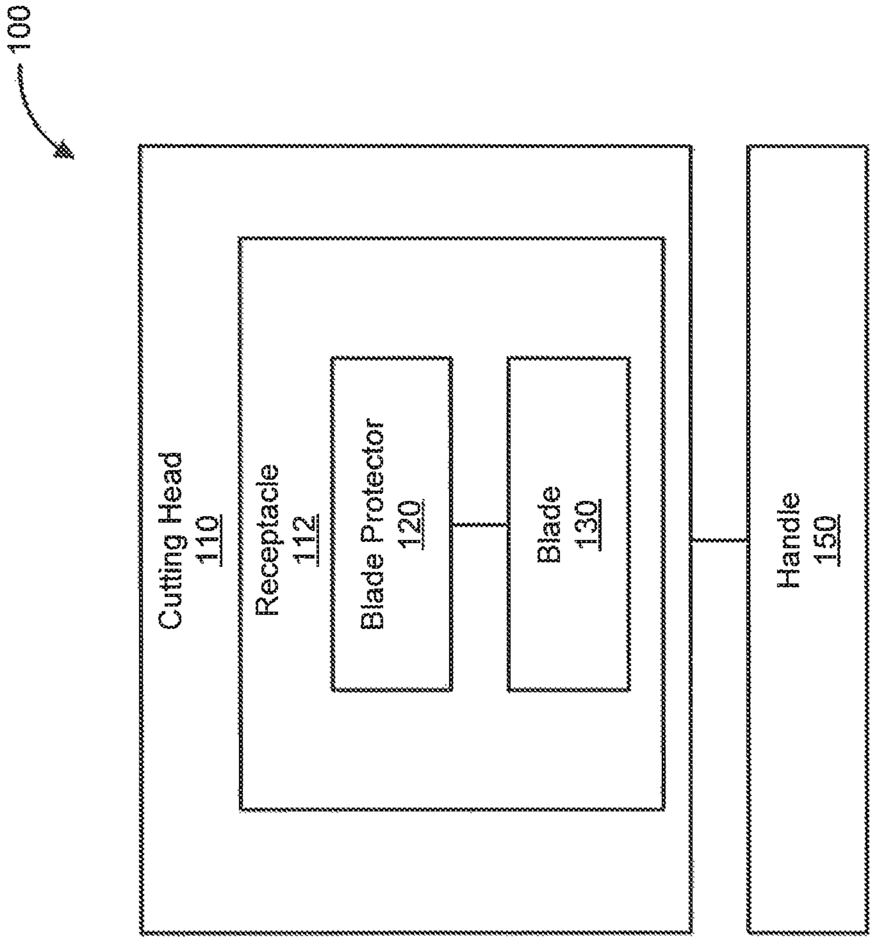
FIG. 1 is a block diagram of a trimming assembly, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for trimming loose hair from dreadlocks, and in particular, to a trimming assembly that includes a cutting head having a receptacle for receiving a single dreadlock and has blades for trimming loose hair from the dreadlock as the cutting head is moved along the dreadlock.

Various embodiments of the systems and methods for trimming loose hair from dreadlocks provides benefits including, for example: (1) allowing trimming of stray hair from a single dreadlock in a quick and easy motion; (2) preventing cutting of the bulk dreadlock by providing a blade protector; (3) ergonomic design for easy handling and maneuverability; and (4) providing manual cutting as well as motorized operations for convenience.

FIG. 1 is a schematic block diagram of a trimming assembly 100, according to an embodiment. The trimming assembly 100 comprises a handle 150 and a cutting head 110 operatively connected to the handle 150 (e.g., positioned at an axial end of the handle 150 and coupled thereto). The handle 150 may include a longitudinal member structured to be gripped between the palm and fingers of a user. The handle 150 may include ergonomic features, for example, a rubberized grip, grooves corresponding to the fingers of the user, indents or bumps for enhancing grip, or any other suitable features. In some embodiments in which the trimming assembly 100 is motorized, the handle 150 may be hollow and include a removable cap. Battery contacts may be provided within the internal volume defined by the handle 150. The cap may be removed to insert batteries into the handle 150 for contacting the battery contacts. In still other embodiments, a rechargeable battery may be positioned within the handle 150 and the handle 150 may be permanently closed. A charging port may be provided in the handle 150 for charging the battery.

The cutting head 110 is positioned in communication with the handle, for example at an end of the handle 150 or at a middle portion of the handle 150. The cutting head 110 may be inclined at an angle in a range of 5-10 degrees with respect to a longitudinal axis of the handle 150. In various embodiments, the cutting head 110 may be formed monolithically with the handle 150. In other embodiment, the cutting head 110 may be removably coupled to the handle 150. The cutting head 110 comprises a cutting head body defining a receptacle 112 at a radial end thereof. The receptacle 112 is structured to receive a dreadlock. In some embodiments, the receptacle 112 may have a perimeter defining a full circle within which a dreadlock may be inserted. In other embodiments, the receptacle 112 may have a perimeter that is less than a full circle such that the receptacle 112 defines a side opening or slot through which a dreadlock may be inserted into the receptacle 112.

A blade protector 120 is positioned axially within the receptacle 112. A curvature of the blade protector 120 corresponds to a curvature of an inner wall of the receptacle 112. A blade 130 is interposed between the blade protector 120 and the inner wall. The blade 130 defines a cutting edge at an axial end thereof proximate to the handle 150. The cutting edge is structured to cut loose hair protruding outwards from the dreadlock as the cutting head 110 is moved along the dreadlock.

The blade protector 120 may define a plurality of slits at a first axial end thereof proximate to the handle 150. In some embodiments, a plurality of slits may also be defined on a second axial end of the blade protector 120 opposite the first axial end. The plurality of slits are structured to expose a portion of the cutting edge of the blade 130 for cutting the loose hair. In this manner, the blade protector 120 only allows a small portion of the cutting edge of the blade 130 to contact the loose hair so as to prevent accidental cutting of the main dreadlock. A length of the blade protector 120 corresponds to a perimetral length of the inner wall of the receptacle 112. For example, the blade protector 120 may have a perimeter corresponding to a full circle, a semi-circle, three quarters of a circle, etc.

In some embodiments, the cutting edge of the blade 130 may be inclined away from the blade protector 120 towards the inner wall of the receptacle 112. This may provide an additional safety measure to prevent the blade 130 accidentally cutting into the main dreadlock. The blade 130 may include a bent blade such that a curvature of the blade 130 corresponds to a curvature of the inner wall of the receptacle 112. For example, the blade 130 may be bent into a circular or semi-circular shape to correspond to the curvature of the receptacle 112. The length of the blade 130 corresponds to a perimetral length of the inner wall of the receptacle 112.

In various embodiments, the cutting head 110 may comprise a plurality of blades. In such embodiments, each of a first set of the plurality of blades may have a cutting edge defined on a first axial end thereof proximate to the handle 150, and each of a second set of the plurality of blades may have a cutting edge defined on a second axial end thereof opposite the first axial end. This may allow cutting of the loose hair as the user slides the trimming assembly 100 along the dreadlock towards the user as well as away from the user.

In some embodiments, the blade 130 comprises a pair of vertical blades. In particular embodiments, the trimming assembly 100 may be motorized. For example, the trimming assembly 100 may comprise an actuating member operably coupled to the pair of vertical blades. The actuating member may be configured to produce lateral movement in the pair of vertical blades so as to facilitate cutting of the dreadlocks. In some embodiments, the motor may be disposed in cutting head 110. In other embodiments, the motor may be disposed on the handle 150. The cutting head 110 may be detachable from the handle 150 such that the motor is removably coupled to the actuating member. This may allow the cutting head 110 to be replaced, for example, in response to damage to cutting head 110 or the blade 130 being worn.

Figure 2:
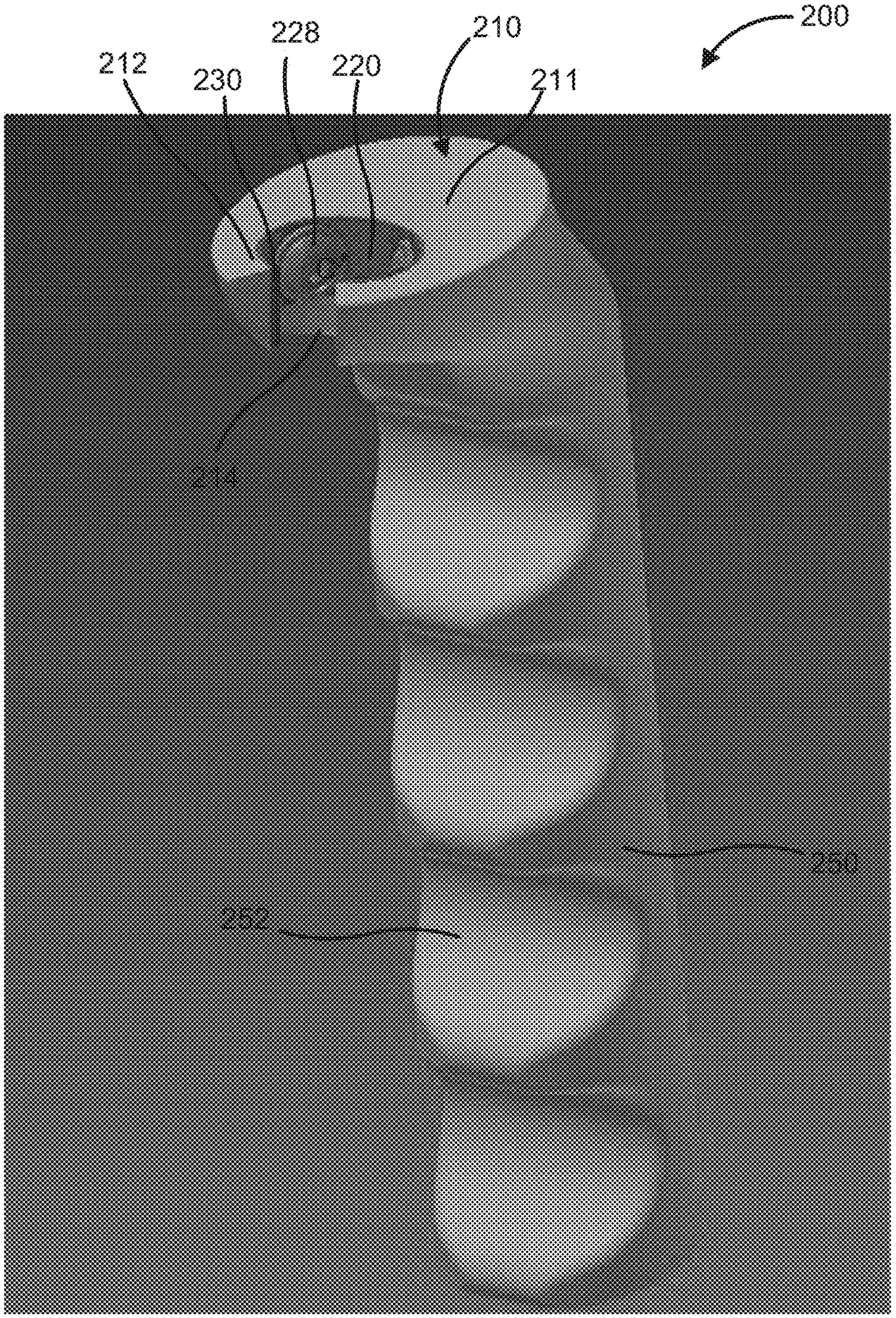
FIG. 2 is a perspective view of a trimming assembly, according to an embodiment.
Figure 3:
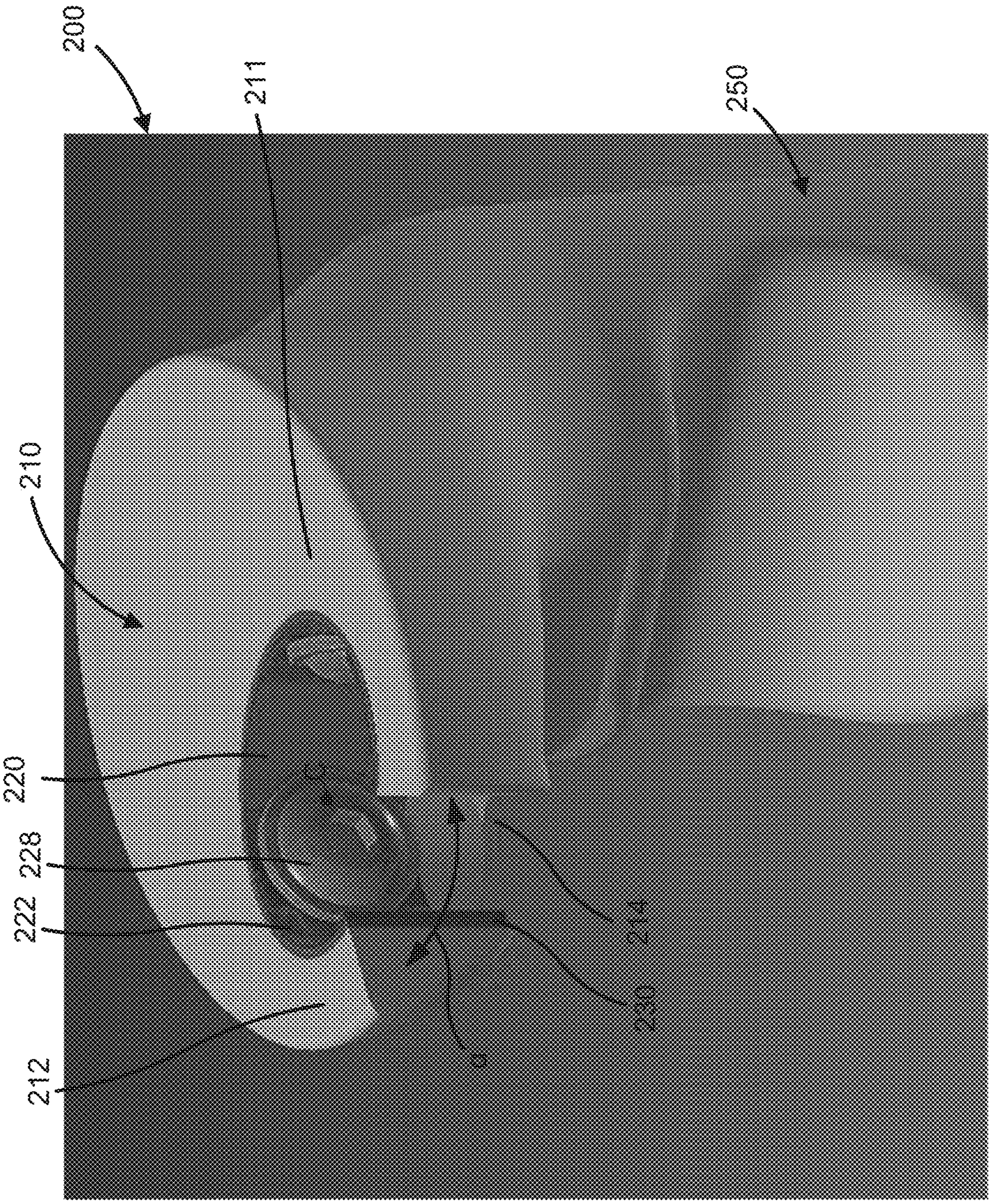
FIG. 3 is a top perspective view of a cutting head of the trimming assembly of FIG. 2.
Figure 4:
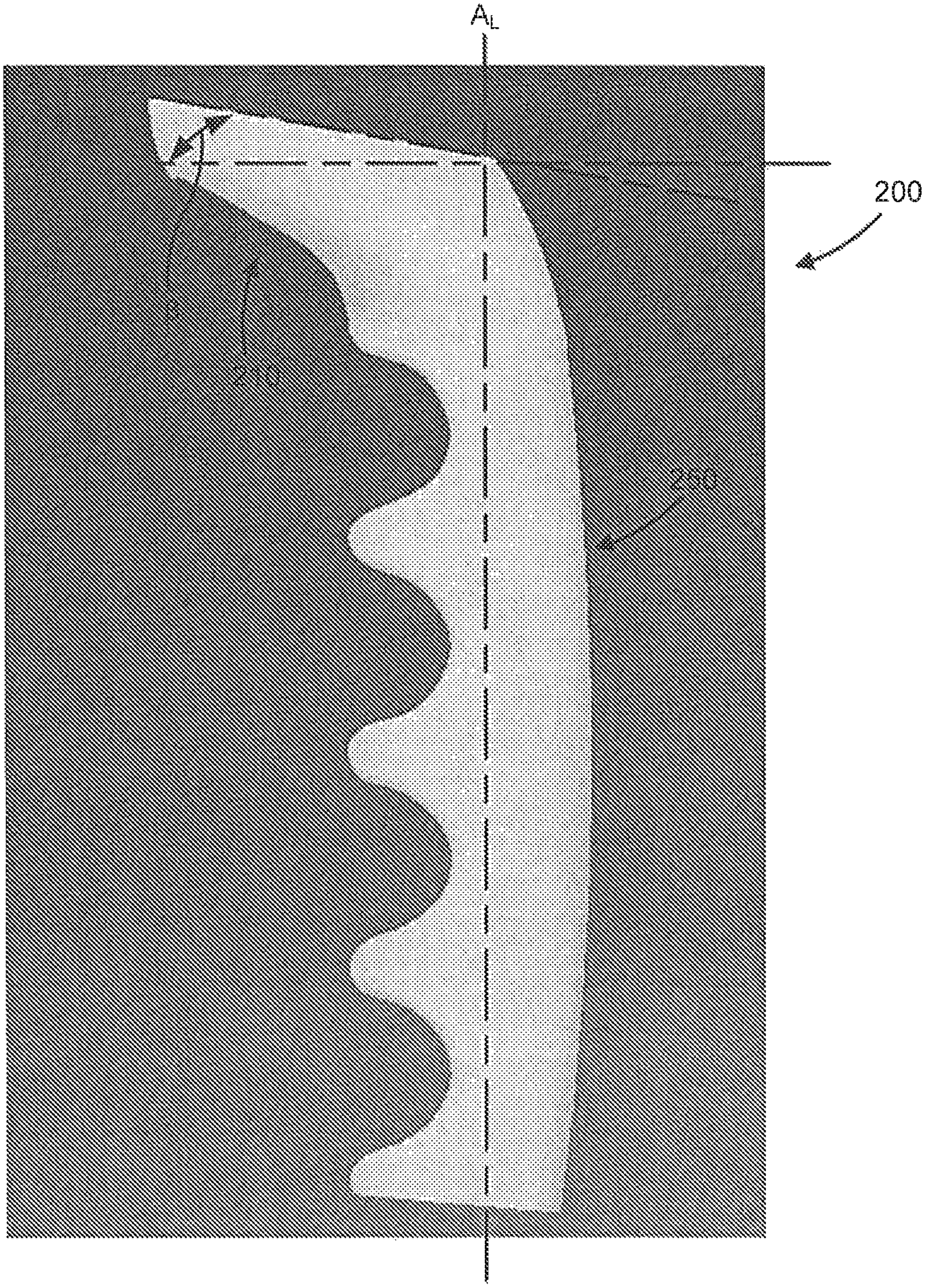
FIG. 4 is a side view of the trimming assembly of FIG. 2.

FIGS. 2-4 are various views of a trimming assembly 200 for cutting loose hair from dreadlocks, according to an embodiment. The trimming assembly 200 comprises a cutting head 210 and a handle 250. The handle 250 is a longitudinal member with the cutting head 210 associated with the handle 250, such as show in FIG. 2, and positioned at an axial end thereof. In some embodiments, the handle 250 and the cutting head 210 may be monolithically formed. In other embodiments, the cutting head 210 may be removably coupled to the handle. 250. The handle 250 includes a longitudinal member which can be gripped between palm and fingers of a user. A plurality of grooves 252 are defined on the handle 250 and correspond to the fingers of a user so as to facilitate gripping of the handle 250 by the user. In other embodiments, the grooves 252 may be excluded. In still other embodiments, the handle 250 may include ergonomic features, for example, a rubberized grip, indents or bumps of enhancing grip, or any other suitable features.

In some embodiments in which the trimming assembly 200 is motorized, the handle 250 may be hollow and include a removable cap, for example, at an axial end of the handle 250 distal from the cutting head 210. Battery contacts may be provided within the internal volume defined by the handle 250. The cap may be removed to insert batteries into the handle 250 for contacting the battery contacts. In still other embodiments, a rechargeable battery may be positioned within the handle 250 and the handle 250 may be permanently closed. A charging port may be provided in the handle 250 for charging the battery.

The cutting head 210 may be inclined at an angle $\beta$ in a range of 5-10 degrees with respect to a longitudinal axis $A_L$ of the handle 250. The cutting head 110 comprises a cutting head body 211 defining a receptacle 212 at a radial end thereof. The receptacle 212 may be positioned at an angle of between 90 degrees and 100 degrees from a distal end of the cutting head body 211. The receptacle 212 includes a center point C and is structured to receive a dreadlock. For example, as shown in FIGS. 3 and 4, the receptacle 212 defines a side opening or slot 214 through which the dreadlock may be inserted into the receptacle 212. In some embodiments, the slot 214 may define an angular opening having an angle $\alpha$ with respect to the center point C in a range of 50-60 degrees. Thus, the receptacle 212 has a perimeter less than a full circle.

Figure 5A:
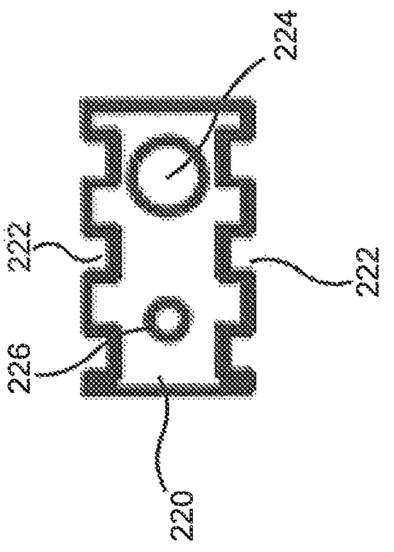
FIG. 5A is a side view of a blade protector of the trimming assembly of FIG. 2.
Figure 5B:
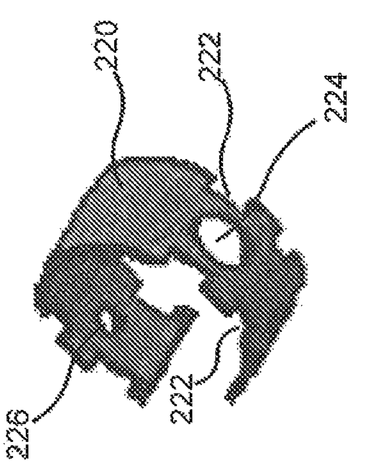
FIG. 5B is a perspective view of the blade protector of FIG. 5A in a bent configuration for fitting into the cutting head of FIG. 3.

A blade protector 220 is positioned axially within the receptacle 212. FIG. 5A shows the blade protector 220 in a planar configuration, and FIG. 5B shows the blade protector 220 in a curved configuration corresponding to a curvature of an inner wall of the receptacle 212. A curvature of the blade protector 220 corresponds to a curvature of an inner wall of the receptacle 212.

A blade 230 is interposed between the blade protector 220 and the inner wall of the receptacle 212 and secured thereto via coupling members 228 (e.g., screws, bolts, pins, snap-fit features, etc.). For example, the blade protector 220 may define throughholes 224 and 226, and the blade 230 defines corresponding throughholes 234 and 236 which are configured to receive a corresponding coupling member 228 therethrough.

Figure 6A:
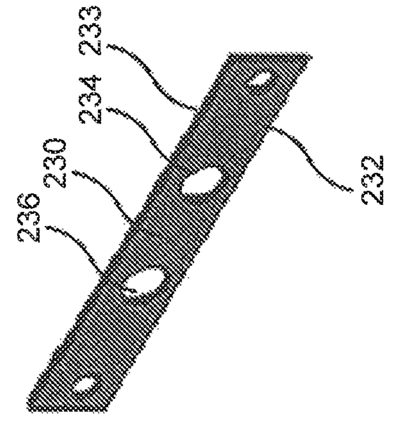
FIG. 6A is a perspective view of a blade of the trimming assembly of FIG. 2.
Figure 6B:
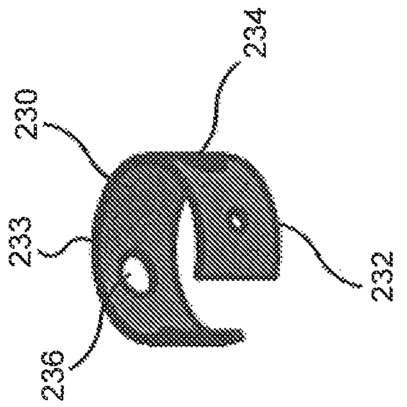
FIG. 6B is a perspective view of the blade of FIG. 6A in a bent configuration for fitting into the cutting head of FIG. 3.

FIG. 6A shows the blade 230 in a planar configuration and FIG. 6B shows the blade 230 in a curved configuration corresponding to the curvature of the inner wall of the receptacle 212. The blade 230 defines a first cutting edge 232 at an axial end thereof proximate to the handle 250. The first cutting edge 232 is structured to cut loose hair protruding outwards from the dreadlock as the cutting head 210 is moved along the dreadlock. The blade 230 may also define a second cutting edge 233 at an opposite axial end of the blade 230. This may allow the blade 230 to cut loose hair from the dreadlock regardless of the direction the cutting head 210 is moved relative to the dreadlock.

The blade protector 220 defines a plurality of slits 222 at each of the axial ends thereof such that the axial ends have a toothed structure. The plurality of slits 222 are structured to expose portions of the corresponding cutting edges of the blade 230 for cutting the loose hair of the dreadlock. In this manner, the blade protector 220 only allows small portions of the corresponding cutting edges 232 and 233 of the blade 230 to be exposed so as to selectively contact and cut loose hairs and prevent accidental cutting of the dreadlock. A length of the blade protector 220 corresponds to a perimetral length of the inner wall of the receptacle 212. For example, the blade protector 220 may have a perimeter corresponding to a full circle, a semi-circle, three quarters of a circle, etc. Furthermore, a length of the blade 230 also corresponds to the perimetral length of the inner wall of the receptacle 212. In other embodiments, the lengths of the blade protector 220 and the blade 230 may be shorter than the perimetral length of the inner wall. The cutting edge of the blade 230 may be inclined away from the blade protector 220 towards the inner wall of the receptacle 212 (e.g., at an angle of 1-5 degrees) as a further safety measure for preventing accidental cutting of the dreadlock.

Figure 7:
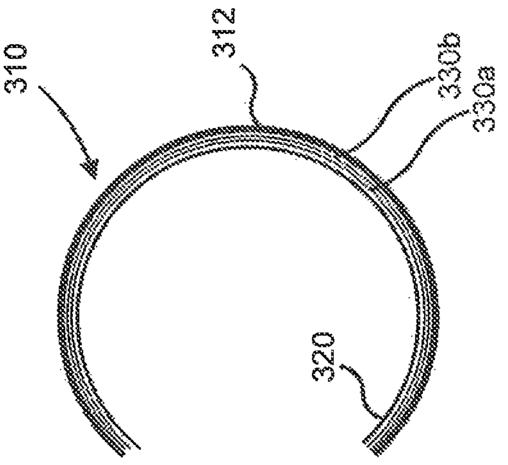
FIG. 7 is a schematic illustration of a cutting head for a trimming assembly, according to another embodiment.

In various embodiments, a cutting head of a trimming assembly for dreadlocks may comprise a plurality of blades. For example, FIG. 7 shows a schematic illustration of a cutting head 310, according to an embodiment. The cutting head 310 forms a circular receptacle 312 defining a slit for inserting a dreadlock into the receptacle 312. The cutting head 310 includes a pair of blades **330*a/b* interposed between a blade protector 320 and an inner wall of the receptacle 312. The blades 330*a/b* and the blade protector 320 have a curvature corresponding to a curvature of an inner wall of the receptacle 312**.

A cutting edge of the first blade **330*a* may be defined on a first axial end thereof (e.g., facing towards a handle of the trimming assembly including the cutting head 310), while a cutting edge of the second blade 330*b* may be defined on a second axial end thereof, opposite the first axial end of the first blade 330*a* (e.g., facing away from the handle). In other embodiments, the cutting head 310** may include four blades, two having a cutting edge defined on a first axial end thereof proximate to the handle, and two having a cutting edge defined on a second axial end opposite the first axial end. In still other embodiments, all the blades may have their cutting edges defined on the same axial end thereof (e.g., a first axial end proximate to the handle.

In some embodiments, the cutting head 310 may include a release mechanism for uncoupling the blades **330*a/b* for allowing replacement of the worn out blades 330*a/b* from the cutting head 310. For example, the release mechanism may be include a spring loaded arm configured to create separation between the blade protector 320 and the inner wall of the receptacle 312 when the release mechanism (e.g., a trigger or a push button) is engaged, so that the blades 330*a/b* may be removed. A new pair of blades 330*a/b* may then be positioned between the blade protector 320 and the receptacle 312. The release mechanism may be disengaged allowing the blade protector 320 to move proximate to the inner wall of the receptacle 312 and secure the blades 330*a/b* cooperatively with the inner wall. In still other embodiments, the cutting head 310 may be removable coupled to the handle (e.g., the handle 250) and may be replaced with a new cutting head once the blades 330*a/b*** are worn.

Figure 8:
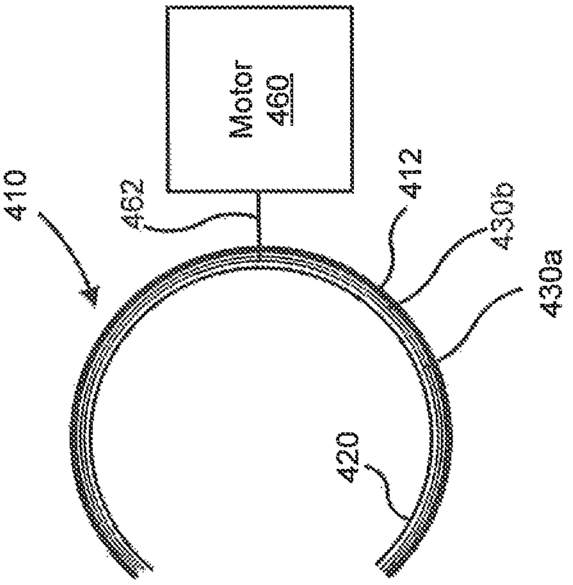
FIG. 8 is a schematic illustration of a cutting head for a trimming assembly, according to yet another embodiment.

In particular embodiment, a cutting head of a trimming assembly may be motorized. For example, FIG. 8 is a schematic illustration of a cutting head 410 according to another embodiment. The cutting head 410 forms a circular receptacle 412 defining a slit for inserting a dreadlock into the receptacle 412. The cutting head 410 includes a pair of blades **430*a/b* interposed between a blade protector 420 and an inner wall of the receptacle 412. The blades 430*a/b* and the blade protector 420 have a curvature corresponding to a curvature of an inner wall of the receptacle 412**.

The trimming assembly also comprises a motor 460 (e.g., a DC or AC motor). The motor 460 may be positioned in a cutting head body of the cutting head 410 or in a handle of the trimming assembly that includes the cutting head 410. The motor 460 may be operably coupled to the blades

430*a/b* via an actuating member 462. The actuating member 462 may include, for example, a cam or a vibrating rod configured to move the blades 430 a/b laterally relative to each other so as to allow cutting of loose hair of the dreadlock.

Figure 9:
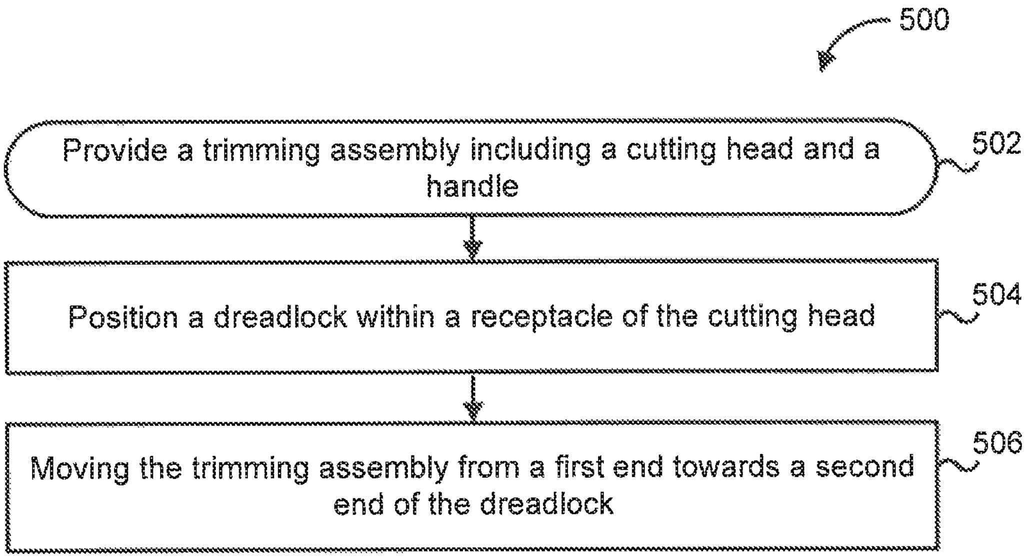
FIG. 9 is a schematic flow diagram of an example method for trimming loose hair from dreadlocks using a trimming assembly, according to an embodiment.

FIG. 9 is a schematic flow diagram of an example method 500 for trimming loose hair from dreadlocks, according to an embodiment. The method 500 includes providing a trimming assembly including a cutting head and a handle, at 502. For example, the trimming assembly 100, 200 including the cutting head 110, 210, 310, 410 and the handle 150, 250 is provided. The cutting head includes a cutting head body (e.g., the cutting head body 211) defining a receptacle (e.g., the receptacle 112, 212, 312, 412) at a radial end thereof. A blade protector (e.g., the blade protector 120, 220, 320, 420) is positioned axially within the receptacle and a curvature of the blade protector corresponds to a curvature of an inner wall of the receptacle. A blade (e.g., the blade 130, 230, 330*a/b*, 430*a/b*) interposed between the blade protector and the inner wall. The blade defines a cutting edge at an axial end thereof proximate to the handle.

At 504, a dreadlock is positioned in the receptacle. For example, a user may grasp an end of a dreadlock and insert the dreadlock within the receptacle 112, 212, 312, 412. The user may be trimming his or her own dreadlock, or a dreadlock of a subject (e.g., a patron visiting a barber shop or hair salon). At 506, the trim assembly is moved from a first end towards a second end of the deadlock. The movement causes the cutting edge of the blade (e.g., the blade 130, 230, 330*a/b*, 430*a/b*) to cut loose hair protruding outwards from the dreadlock. In various embodiments, the blade protector (e.g., the blade protector 120, 220, 320, 420) may define a plurality of slits at a first axial end thereof proximate to the handle and/or a second axial end thereof distal from the handle. The plurality of slits are structured to expose a portion of the cutting edge of the blade for cutting the loose hair from the dreadlock without cutting into the dreadlock, as previously described in detail.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

In the above description, certain terms may be used such as "up," "down," "upper," "lower," "top," "bottom," "upper," "lower," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A cutting head for trimming dreadlocks, the cutting head comprising:

- a cutting head body comprising:
  - a head portion defining:
    - an outer wall; and
    - an inner wall offset from the outer wall, the inner wall having a curvature and a perimetral length, the inner wall extending between a first upper end and a second lower end opposite the first upper end, the inner wall defining a receptacle, the receptacle centered on a first axis; and
  - a handle extending from the head portion, the handle extending along a second axis, the second axis offset from the first axis, wherein a gap is formed between the second lower end of the inner wall and the handle; and
- a blade coupled to the inner wall of the head portion within the receptacle and having a complementary curvature to the curvature of the inner wall, the blade comprising a first cutting edge located proximate to one of the first, upper end, and the second, lower end of the inner wall, the first cutting edge defining a first length corresponding to the perimetral length of the inner wall of the head portion, and the first cutting edge having the complementary curvature.

2. The cutting head of claim 1, wherein:

the curvature of the inner wall defines a first arc; and the complementary curvature of the blade and the first cutting edge defines a second arc;

wherein the first arc and the second arc each form a portion of a circle.

3. The cutting head of claim 2, wherein the first arc of the inner wall is approximately equal to three quarters of a circle.

4. The cutting head of claim 1, further comprising a blade protector coupled to the inner wall such that the blade is interposed between the blade protector and the inner wall, the blade protector comprising:

a first protector edge positioned proximate to the first cutting edge when the blade protector is coupled to the receptacle.

5. The cutting head of claim 4, wherein the blade protector further comprises a plurality of slits positioned along the first protector edge, the plurality of slits structured to selectively expose portions of the first cutting edge of the blade.

6. The cutting head of claim 2, wherein:

the head portion further defines a slot such that the inner wall is not a full circle.

7. The cutting head of claim 6, wherein the slot defines an angular opening having an angle between ends of the inner wall that form the slot, the angle between 50-60 degrees, inclusive.

8. The cutting head of claim 1, wherein the blade is removably coupled to the inner wall such that the blade is replaceable.

9. A cutting head for a trimming assembly, the cutting head comprising:

a head portion defining:

an outer wall; and an inner wall offset from the outer wall, the inner wall having a curvature and a perimetral length, the inner wall extending between a first upper end and a second lower end, the second lower end opposite the first upper end, the inner wall defining a receptacle, the receptacle centered on a first axis;

a handle extending from the head portion, the handle extending along a second axis, the second axis offset from the first axis, the offset of the first axis and the second axis configured to enable the receptacle to be accessed from the first upper end and the second lower end; and a blade assembly coupled to the inner wall and having a complementary curvature to the curvature of the inner wall, the blade assembly comprising:

a first cutting edge located proximate to the first, upper end, the first cutting edge defining a first length less than or equal to the perimetral length of the inner wall; and a second cutting edge located proximate to the second, lower end, the second cutting edge defining a second length less than or equal to the perimetral length of the inner wall of the receptacle.

10. The cutting head of claim 9, wherein the blade assembly comprises a double-edged blade having the first cutting edge and the second cutting edge positioned opposite one another.

11. The cutting head of claim 9, wherein the blade assembly comprises a first blade having the first cutting edge and a second blade having the second cutting edge.

12. The cutting head of claim 9, wherein the inner wall is cylindrical.

13. The cutting head of claim 9, wherein the head portion defines a slot configured for receiving a dreadlock such that the inner wall is not a full circle.

14. A trimming device comprising:

a head portion defining:

an outer wall; and an inner wall offset from the outer wall, the inner wall having a curvature and a perimeter, the inner wall extending between a first end and a second end, the first end opposite the second end, the inner wall defining a receptacle, the receptacle centered on a first axis; and a handle extending from the head portion, the handle extending along a second axis, the second axis offset from the first axis, the offset of the first axis and the second axis configured to enable the receptacle to be accessed from the first end and the second end;

a blade coupled to the inner wall having a blade curvature corresponding to the inner wall, the blade comprising:

a first cutting edge located proximate to one of the first end and the second end, the first cutting edge defining a length equal to or less than the perimeter of the inner wall.

15. The trimming device of claim 14, wherein:

the perimeter of the inner wall is circular; and a first diameter of the first end is similar to a second diameter of the second end.

16. The trimming device of claim 14, wherein the first cutting edge is located proximate to the first end and the blade is a first blade, the trimming device further comprising a second cutting edge located proximate to the second end and defining a second edge length equal to or less than the perimeter of the inner wall the second cutting edge belonging to one of the first blade and a second blade.

17. The trimming device of claim 16, further comprising a blade protector coupled to the inner wall, the blade protector comprising:

a first protector edge positioned proximate to the first cutting edge when the blade protector is coupled to the inner wall; and a second protector edge positioned proximate to the second cutting edge when the blade protector is coupled to the inner wall.

18. The trimming device of claim 17, wherein the blade protector further comprises a first plurality of slits positioned along the first protector edge and a second plurality of slits positioned alone the second protector edge, the first plurality of slits structured to selectively expose portions of the first cutting edge of the blade and the second plurality of slits structured to selectively expose portions of the second cutting edge.

19. The cutting head of claim 1, wherein a cross-section of the head portion defines:

a center portion extending between the inner wall and the outer wall;

a first extension portion extending from the center portion, the first extension portion extending between the inner wall and the outer wall;

a second extension portion extending from the center portion, the second extension portion extending between the inner wall and the outer wall, the first extension portion and the second extension portion at least partially encircling the receptacle; and a slot separating an end of the first extension portion from an end of the second extension portion.

20. The cutting head of claim 1, wherein the head portion defines a first slot wall and a second slot wall, the first slot wall spaced from the second slot wall, the first slot wall and the second slot wall defining a slot, the first slot wall extending between the inner wall and the outer wall, and the second slot wall extending between the inner wall and the outer wall.

* * * * *